(12) United States Patent
Kodera et al.

(10) Patent No.: US 11,838,322 B2
(45) Date of Patent: Dec. 5, 2023

(54) PHISHING SITE DETECTION DEVICE, PHISHING SITE DETECTION METHOD AND PHISHING SITE DETECTION PROGRAM

(71) Applicant: NIPPON TELEGRAPH AND TELEPHONE CORPORATION, Tokyo (JP)

(72) Inventors: Hirokazu Kodera, Musashino (JP); Toshiki Shibahara, Musashino (JP); Daiki Chiba, Musashino (JP); Yuta Takata, Musashino (JP); Kazufumi Aoki, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 435 days.

(21) Appl. No.: 17/291,607

(22) PCT Filed: Oct. 10, 2019

(86) PCT No.: PCT/JP2019/040127
§ 371 (c)(1),
(2) Date: May 6, 2021

(87) PCT Pub. No.: WO2020/105308
PCT Pub. Date: May 28, 2020

(65) Prior Publication Data
US 2022/0021703 A1    Jan. 20, 2022

(30) Foreign Application Priority Data
Nov. 19, 2018   (JP) ................................ 2018-216576

(51) Int. Cl.
*H04L 9/40*    (2022.01)

(52) U.S. Cl.
CPC ................................ *H04L 63/1483* (2013.01)

(58) Field of Classification Search
CPC ............... H04L 63/1483; G06F 21/577; G06F 2221/2119

(Continued)

(56) References Cited

U.S. PATENT DOCUMENTS 8,856,937 B1 * 10/2014 Wuest ..................... G06F 21/56
                                                        713/188
9,094,452 B2 *  7/2015 Larkins ............... H04L 63/1483

OTHER PUBLICATIONS

International Search Report and Written Opinion dated Dec. 10, 2019, received for PCT Application No. PCT/JP2019/040127, filed on Oct. 10, 2019, 6 pages including English Translation.

(Continued)

*Primary Examiner* — Benjamin A Kaplan
(74) *Attorney, Agent, or Firm* — XSENSUS LLP

(57) ABSTRACT

A phishing site detection device extracts, from a phishing kit, a condition of access sources with which the access to a phishing site is blocked. Then, the phishing site detection device accesses a phishing site constructed by the phishing kit using one or more extracted conditions of access sources, and stores an access result for each condition of access sources in an access result storage module. Thereafter, the phishing site detection device sets a condition of access sources with which the access to the phishing site constructed by the phishing kit is blocked, accesses a website to be detected, and determines whether the website is a phishing site on the basis of the access result.

7 Claims, 13 Drawing Sheets

(58) Field of Classification Search
USPC .......................................................... 726/25
See application file for complete search history.

(56) References Cited

OTHER PUBLICATIONS

Mao et al., "Phishing-Alarm: Robust and Efficient Phishing Detection via Page Component Similarity", In Proceedings of the IEEE Access, vol. 5, Sep. 19, 2017, pp. 17020-17030.
Asudeh et al., "Poster: Phishing Website Detection with a Multiphase Framework to Find Visual Similarity", In Proceedings of the ACM SIGSAC Conference on Computer and Communications Security (CCS '16), Oct. 24-28, 2016, pp. 1790-1792.

* cited by examiner

FIG.2

| PHISHING KIT NO. | UA/SampleA | UA/SampleB | UA/SampleC | Ref/SampleX | Ref/SampleY | Ref/SampleZ |
|---|---|---|---|---|---|---|
| 1 | 200 | 200 | 403 | 403 | 200 | 200 |
| 2 | 403 | 403 | 403 | 200 | 200 | 200 |
| 3 | 200 | 403 | 200 | 200 | 200 | 200 |

| LABEL | UA/SampleA | UA/SampleB | UA/SampleC | Ref/SampleX | Ref/SampleY | Ref/SampleZ |
|---|---|---|---|---|---|---|
| Phishing | 200 | 200 | 403 | 403 | 200 | 200 |
| Phishing | 403 | 403 | 403 | 200 | 200 | 200 |
| Phishing | 200 | 403 | 200 | 200 | 200 | 200 |
| Benign | 200 | 200 | 200 | 200 | 200 | 200 |

FIG.4
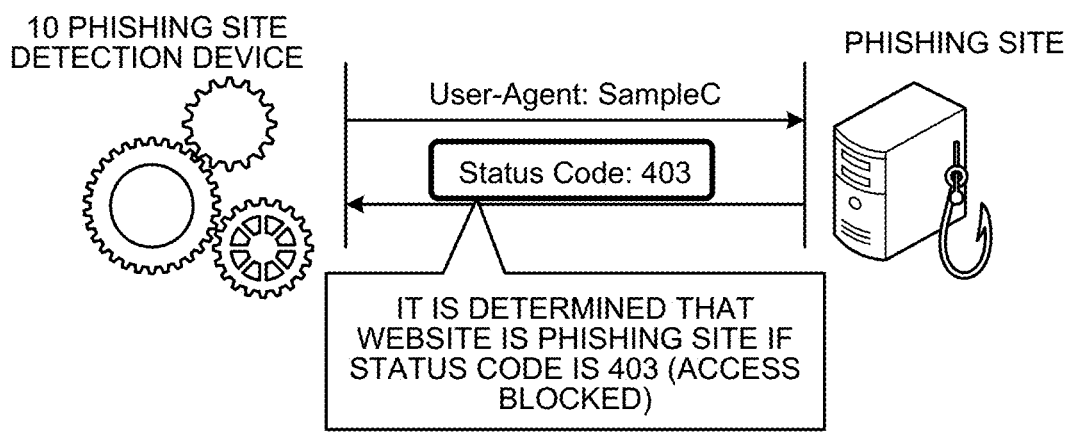
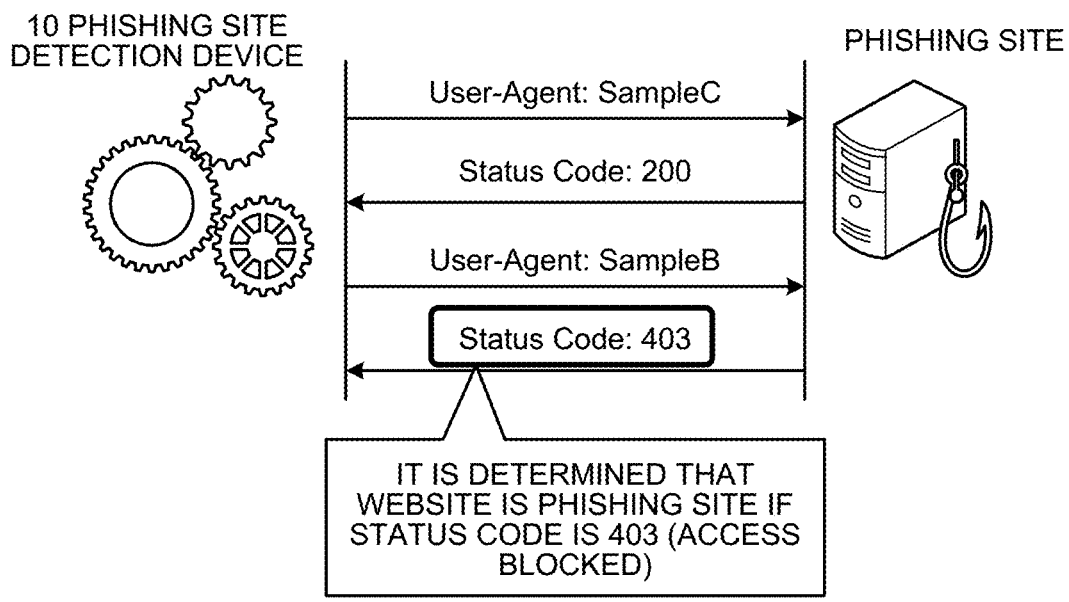

FIG.8

| | |
|---|---|
| PHISHING SITE URL | http://phish.example.com/aaa/bbb/login/info/index.php |
| DOWNLOAD CANDIDATE (1-1) | http://phish.example.com/aaa/bbb/login/info/ |
| DOWNLOAD CANDIDATE (1-2) | http://phish.example.com/aaa/bbb/login/ |
| DOWNLOAD CANDIDATE (1-3) | http://phish.example.com/aaa/bbb/ |
| DOWNLOAD CANDIDATE (1-4) | http://phish.example.com/aaa/ |
| DOWNLOAD CANDIDATE (1-5) | http://phish.example.com/ |

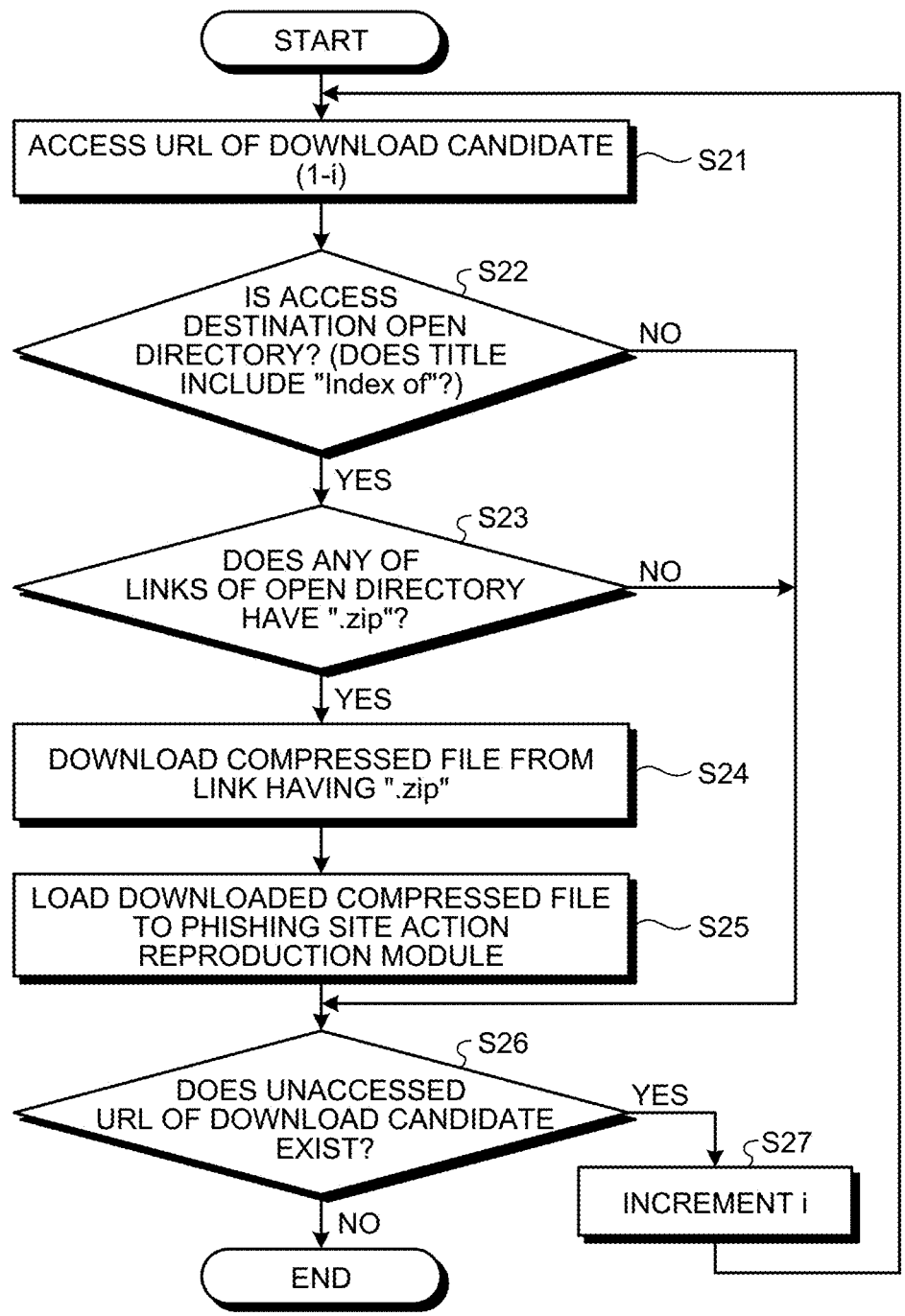

FIG.10

| PHISHING SITE URL | http://phish.example.com/aaa/bbb/login/info/index.php |
|---|---|
| DOWNLOAD CANDIDATE (2-1) | http://phish.example.com/aaa/bbb/login/info.zip |
| DOWNLOAD CANDIDATE (2-2) | http://phish.example.com/aaa/bbb/login.zip |
| DOWNLOAD CANDIDATE (2-3) | http://phish.example.com/aaa/bbb.zip |
| DOWNLOAD CANDIDATE (2-4) | http://phish.example.com/aaa.zip |

FIG.11

```
RewriteEngine on
# Options +FollowSymlinks
RewriteCond %{HTTP_REFERER} example\.com [NC,OR]
RewriteCond %{HTTP_REFERER} example\.com
RewriteRule .* - [F]
RewriteCond %{HTTP_USER_AGENT} ^SampleA [OR]
RewriteCond %{HTTP_USER_AGENT} ^SampleB [OR]
RewriteCond %{HTTP_USER_AGENT} ^SampleC
RewriteRule ^.* - [F,L]
RewriteEngine on
RewriteCond %{HTTP_REFERER} ^http://example.com$ [NC]
RewriteRule .* - [F,L]

order allow,deny
deny from 192.0.2.0/24
deny from 198.51.100.0/24
deny from 203.0.113.0/24
deny from example.com
deny from env=stealthed
allow from all
```

101

102 Regex: ^RewriteCond\s*\\%\\{[^\s]*\}\s*(?P<Referer>[^"'\s]*)\s*[^\s]*$

103

104 Regex: ^RewriteCond\s*\\%\\{[^\s]*\}\s*(?P<Referer>[^"'\s]*)\s*[^\s]*$

PHISHING SITE DETECTION DEVICE, PHISHING SITE DETECTION METHOD AND PHISHING SITE DETECTION PROGRAM

CROSS-REFERENCE TO RELATED APPLICATIONS

The present application is based on PCT filing PCT/JP2019/040127, filed Oct. 10, 2019, which claims priority to JP 2018-216576, filed Nov. 19, 2018, the entire contents of each are incorporated herein by reference.

FIELD

The present invention relates to a phishing site detection device, a phishing site detection method, and a phishing site detection program.

BACKGROUND

As the conventional phishing detection technique, there exist detection techniques using the contents of phishing sites such as a detection technique using the similarity in cascading style sheets (CSS) between a login page of a regular website and a phishing site and a detection technique using the similarity in logo images used in pages. In these techniques, the information of regular websites as a detection index is learned preliminarily to determine whether a website is a phishing site on the basis of the characteristics of the acquired contents.

CITATION LIST

Non Patent Literature

Non Patent Literature 1: J. Mao, W. Tian, P. Li, T. Wei and Z. Liang, "Phishing-Alarm: Robust and Efficient Phishing Detection via Page Component Similarity", in IEEE Access, vol. 5, pp. 17020-17030, 2017.

Non Patent Literature 2: Omid Asudeh and Matthew Wright, POSTER: Phishing Website Detection with a Multiphase Framework to Find Visual Similarity. In Proceedings of the 2016 ACM SIGSAC Conference on Computer and Communications Security (CCS '16). ACM, New York, N.Y., USA, 1790-1792. 2016.

SUMMARY

Technical Problem

Some phishing sites have an access block function for blocking the access from a search engine bot or a security vendor in order to avoid listing in research results of a search engine or listing on a black list. In such sites, the access block function disables acquisition of contents and comparison of characteristics with learned data of regular websites. Thus, it has not been possible to determine whether the site is a phishing site.

Therefore, the present invention aims at solving the above-described problem and detecting even a phishing site having an access block function as a phishing site.

Solution to Problem

In order to solve the above problem, the present invention includes A phishing site detection device, comprising: a phishing kit acquisition module configured to acquire a phishing kit that is a tool for constructing a phishing site; a phishing site reproduction module configured to construct a phishing site using the acquired phishing kit and reproduce actions of a phishing site; a block condition extraction module configured to extract, from the phishing kit, a condition of access sources with which an access to the phishing site constructed using the phishing kit is blocked; an access module configured to access each phishing site constructed by each phishing kit using the extracted condition of access sources, and form access result information that associates an access result regarding the phishing site and the condition of access sources used for the access to the phishing site; and a phishing site detection module configured to select a condition of access sources with which the access to the phishing site is blocked on a basis of the access result indicated in the access result information, perform processing of accessing a website that has a possibility of being a phishing site at least once, and determine, if the access to the website is blocked, that the website is a phishing site.

Advantageous Effects of Invention

In the invention, it is possible to detect even a phishing site having an access block function as a phishing site.

BRIEF DESCRIPTION OF DRAWINGS

FIG. 2 is a diagram illustrating an example of access result information stored in an access result storage module of FIG. 1.

FIG. 4 is a diagram for explaining the detection of a phishing site using the patterns of User-Agent, Referer extracted in FIG. 3.

FIG. 8 is a diagram illustrating examples of a candidate of a URL of a download source of a phishing kit (download candidate) that is generated by a phishing kit download module of FIG. 1.

FIG. 9 is a flowchart illustrating an example of a processing procedure for downloading a phishing kit from a URL of a download candidate by the phishing kit download module of FIG. 1.

FIG. 10 is a diagram illustrating other examples of a candidate of a URL of a download source of a phishing kit (download candidate) that is generated by a phishing kit download module of FIG. 1.

FIG. 11 is a diagram illustrating an example of extraction of block conditions by a block condition extraction module of FIG. 1.

DESCRIPTION OF EMBODIMENTS

The following will describe an embodiment of the invention with reference to the enclosed drawings. First, the overview of a phishing site detection device 10 of the embodiment will be described with reference to FIG. 1. The invention is not limited to the embodiment described in the following.

Overview

The phishing site detection device 10 acquires a phishing kit (a tool for constructing a phishing site) from a phishing site on the Internet, constructs a phishing site in a closed environment, and operates the phishing site, for example. Then, the phishing site detection device 10 sets a condition of access sources with which the access may be blocked (a block condition such as a User-Agent, Referer, and the like, for example) to access the phishing site constructed in a closed environment, and stores therein an access result with such a block condition (whether the access is blocked, for example). Note that as the block condition, a condition extracted from .htaccess in the phishing kit is used, for example.

Thereafter, the phishing site detection device 10 reads out the stored access result information (a set of access results), changes the access pattern (User-Agent, Referer, and the like used in access, for example), and accesses a website that may be a phishing site a plurality of times. Then, the phishing site detection device 10 determines whether the website is a phishing site on the basis of a response from the website.

For example, the phishing site detection device 10 reads out a plurality of block conditions blocked in each phishing site constructed in a closed environment, sequentially sets the block conditions, and accesses a website that may be a phishing site. As a result, when the access to the website is blocked, the phishing site detection device 10 determines that the website is a phishing site. Meanwhile, when the access to the website is not blocked, the phishing site detection device 10 determines that the website is not a phishing site.

In this manner, the phishing site detection device 10 regards the action of the access block function in the phishing site as the characteristics of the phishing site, and detects a phishing site. Consequently, the phishing site detection device 10 is able to detect even a phishing site having an access block function as a phishing site.

Configuration

Figure 1:
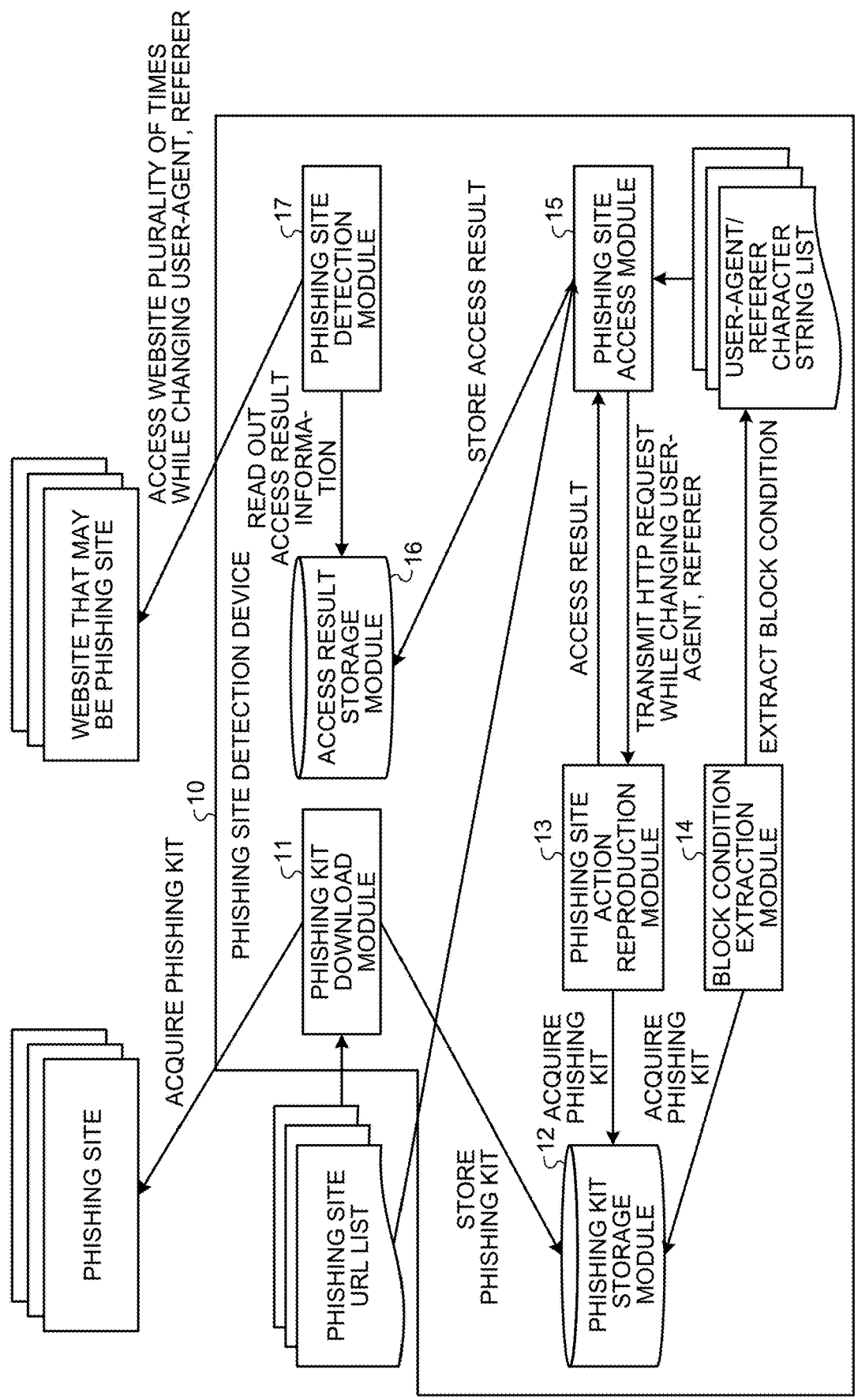
FIG. 1 is a diagram illustrating an overview and a configuration example of a phishing site detection device according to an embodiment.

The following will describe a configuration example of the phishing site detection device 10 with reference to FIG. 1. The phishing site detection device 10 includes, for example, a phishing kit download module (phishing kit acquisition module) 11, a phishing kit storage module 12, a phishing site action reproduction module 13, a block condition extraction module 14, a phishing site access module (access module) 15, an access result storage module 16, and a phishing site detection module 17.

The phishing kit download module 11 downloads (acquires) a phishing kit from a phishing site, and stores the downloaded phishing kit in the phishing kit storage module 12. Note that the phishing kit is a tool for constructing a phishing site as described above, and includes, for example, an HTML file imitating a login page or an image file, a program code such as PHP for transmitting verification information by a mail, for example, and a .htaccess file of Apache or a PHP code for blocking the access from given access sources.

An evil-minded person may forget to delete the phishing kit after constructing a phishing site, for example, and the phishing kit may remain in the phishing site. Thus, the phishing kit download module 11 accesses a phishing site on the basis of a list of URLs of phishing sites (a phishing site URL list) acquired from a black list or the like, for example, and intends to download the phishing kit. Here, which directory of a phishing site stores therein a phishing kit may be unknown. Thus, the phishing kit download module 11 generates a plurality of URLs of download sources of the phishing kit (URLs of download candidates) from the URL of the phishing site, accesses the generated URLs, and intends to download the phishing kit. Note that the above-described generation of URLs of download sources of the phishing kit will be described later using a concrete example.

The phishing kit storage module 12 stores therein a phishing kit acquired by the phishing kit download module 11.

The phishing site action reproduction module 13 loads the phishing kit acquired by the phishing kit download module 11, constructs a phishing site, and reproduces an action of the phishing site.

For example, the phishing site action reproduction module 13 acquires a phishing kit from the phishing kit storage module 12, loads the phishing kit in a closed environment (on a server where the communication with the outside is restricted, for example), constructs a phishing site, and operates it. Note that the phishing site action reproduction module 13 uses Apache and PHP, for example, as a server application operating the phishing site.

The block condition extraction module 14 extracts, from each phishing kit, one or more conditions of access sources with which the access is blocked (block conditions) in the phishing site constructed by the phishing kit.

For example, after acquiring one or more phishing kits from the phishing kit storage module 12, the block condition extraction module 14 extracts, from a .htaccess file of each acquired phishing kit, User-Agent and Referer that are block conditions, in a regular expression. Then, the block condition extraction module 14 generates a User-Agent/Referer character string list where the extracted User-Agent and Referer are listed.

The phishing site access module 15 uses the block conditions extracted by the block condition extraction module 14 to access each of the phishing sites constructed by the phishing kits. Then, the phishing site access module 15 generates access result information that associates an access result to each phishing site (a status code of an HTTP response, for example) and a block condition used for the access to the phishing site.

For example, the phishing site access module 15 transmits an HTTP request with User-Agent, Referer in the User-Agent/Referer character string list set as a header, to a phishing site. Having received a response (HTTP response) from the phishing site, the phishing site access module 15 associates a phishing kit used for constructing the phishing site, User-Agent (UA) or Referer (ref) set in the HTTP request to the phishing site, and a status code of a response (HTTP response) from the phishing site, and records them in access result information (see FIG. 2).

For example, the access result information illustrated in FIG. 2 indicates that in the case of transmitting an HTTP request with UA "SampleB" to a phishing site constructed by a phishing kit "No. 1", the status code of the response is "200 (success)" and in the case of transmitting an HTTP request with UA "SampleC" thereto, the status code of the response is "403 (access blocked)". Moreover, it indicates that in the case of transmitting an HTTP request with Ref "SampleX" to the phishing site constructed by the phishing kit "No. 1", the status code of the response is "403 (access blocked)" and in the case of transmitting an HTTP request with Ref "SampleY" thereto, the status code of the response is "200 (success)".

Note that in order to access a phishing site constructed by the phishing site action reproduction module 13, the phishing site access module 15 needs to access a file that may be used as a login page of the phishing site. Thus, the phishing site access module 15 uses the URL of the phishing site as the download source of the phishing kit and the phishing kit so as to specify a file that may be used as a login page of the phishing site (a file of a phishing login page). The specifying of the file of the phishing login page here will be described later using a concrete example.

The explanation will be returned to FIG. 1. The phishing site detection module 17 selects and sets a condition of the access source with which the access to the phishing site is blocked on the basis of the access result indicated in the access result information, performs processing of accessing a website that may be a phishing site at least once, and determines, if the access to the website is blocked, that the website is a phishing site.

For example, the phishing site detection module 17 extracts, from the access result information of the access result storage module 16, one or more User-Agent, Referer with which the access to the phishing site is blocked, and transmits an HTTP request with the extracted one or more User-Agent, Referer to a website that may be a phishing site. That is, the phishing site detection module 17 accesses the website a plurality of times while changing User-Agent, Referer, and determines, if the access to the website is blocked, that the website is a phishing site.

Here, the phishing site detection module 17 preferably extracts patterns of User-Agent, Referer with which the access block function of a phishing site blocks access with high probability and the phishing site is detected with the minimum number of times of access. Thus, the phishing site detection module 17 extracts, from the access result information, patterns of User-Agent, Referer used for the detection of a phishing site in the following manner, for example.

Figure 3:
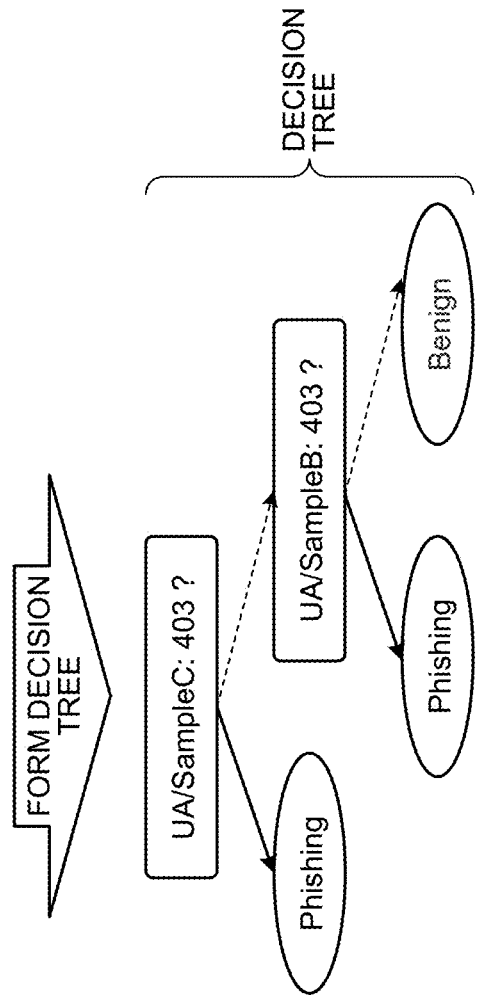
FIG. 3 is a diagram for explaining an example of the extraction of patterns of User-Agent, Referer based on the access result information of FIG. 2.

For example, the phishing site detection device 10 forms a decision tree illustrated in the lower part of FIG. 3, on the basis of the access result of UA "SampleC" and UA "SampleB" in the access result information illustrated in the upper part of FIG. 3. Then, on the basis of the conditions indicated by the formed decision tree, the phishing site detection module 17 sets UA "SampleC" and UA "SampleB" to access a website that may be a phishing site, and determines whether the website is a phishing site (phishing) or a non-phishing site (benign) on the basis of the access result.

For example, on the basis of the decision tree illustrated in FIG. 3, the phishing site detection module 17 sets "SampleC" to UA to access the website, and determines that the website is a phishing site (phishing) if the status code of the access result is "403" (access blocked).

Moreover, if the status code of the access result regarding the website is not "403", the phishing site detection module 17 sets "SampleB" to UA, and access the website again. Then, if the status code of the access result regarding the website is "403", the phishing site detection module 17 determines that the website is a phishing site (phishing). On the other hand, if the status code of the access result regarding the website is not "403", the phishing site detection module 17 determines that the website is not a phishing site (benign).

That is, as illustrated in the upper part of FIG. 4, the phishing site detection module 17 sets "SampleC" to UA to access the website, and determines, if the status code of the access result is "403" (access blocked), that the website is a phishing site.

Moreover, as illustrated in the lower part of FIG. 4, the phishing site detection module 17 sets "SampleC" to UA to access the website, and if the status code of the access result is "200" (not "403"), it sets "SampleB" to UA to access the website again. Then, if the status code of the access result regarding the website is "403" (access blocked), the phishing site detection module 17 determines that the website is a phishing site.

Figure 5:
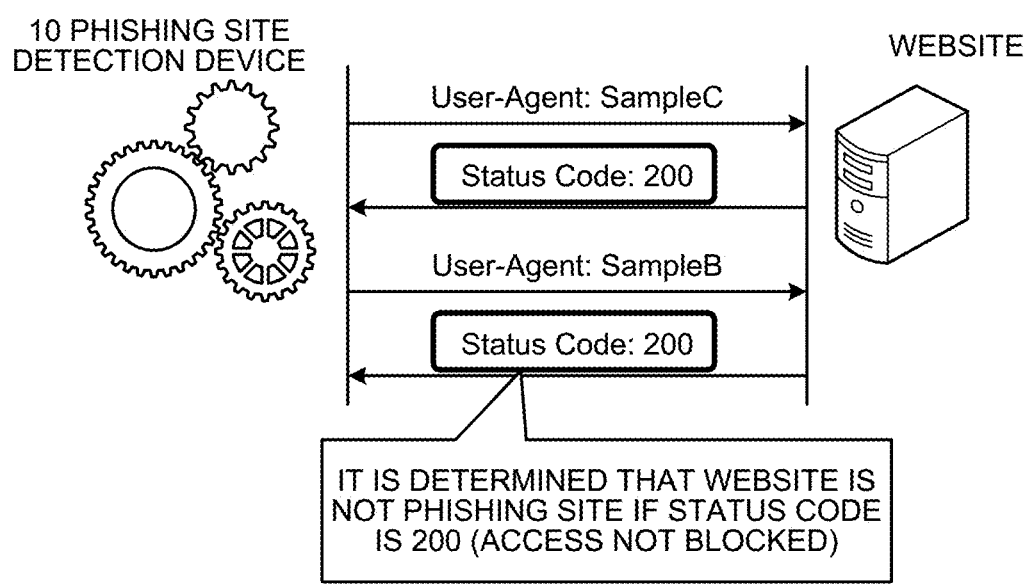
FIG. 5 is a diagram for explaining the detection of a phishing site using the patterns of User-Agent, Referer extracted in FIG. 3.

Moreover, as illustrated in the lower part of FIG. 5, the phishing site detection module 17 sets "SampleC" to UA to access the website, and if the status code of the access result is "200" (not "403"), it sets "SampleB" to UA to access the website again. Then, if the status code of the access result regarding the website is "200" (access not blocked), the phishing site detection module 17 determines that the website is not a phishing site.

In this manner, the phishing site detection module 17 extracts, on the basis of access result information, patterns of block conditions used for the access to a website that may be a phishing site. Then, the phishing site detection module 17 accesses the website in accordance with the extracted patterns of block conditions. That is, the phishing site detection module 17 accesses the website that may be a phishing site a plurality of times while changing block conditions. Then, the phishing site detection module 17 determines whether the website is a phishing site on the basis of the access result regarding the website.

In the above-described phishing site detection device 10, it is possible to detect even a phishing site having an access block function as a phishing site.

[Processing procedures]

The following will describe an example of processing procedure by the phishing site detection device 10. Using FIG. 6, there will be explained first an example of processing procedures by the phishing site detection device 10 for collecting access results regarding a phishing site constructed by a phishing kit.

First, the phishing kit download module 11 of the phishing site detection device 10 generates a URL of a download candidate of a phishing kit (S1), access the URL, and downloads a phishing kit (S2). Then, the phishing kit download module 11 stores therein the downloaded phishing kit in the phishing kit storage module 12.

After S2, the block condition extraction module 14 acquires the phishing kit from the phishing kit storage module 12, and extracts block conditions (User-Agent. Referer) from .htaccess included in the phishing kit (S3). Moreover, the phishing site action reproduction module 13 constructs a phishing site using the phishing kit downloaded at S2 (S4).

After S4, the phishing site access module 15 generates a URL of a login page of the phishing site constructed at S4 (S5: generate URL of phishing login page). Thereafter, the phishing site access module 15 sets the block conditions extracted at S3, and accesses the login page of the phishing site constructed at S4 so as to collect access results regarding the phishing site (S6).

For example, at S6, the phishing site access module 15 records, in the access result information (see FIG. 2), the access result that associates a phishing kit used for constructing a phishing site by the phishing site action reproduction module 13, a block condition (User-Agent, Referer) set in an HTTP request to the phishing kit site, and a status code of a response (http response) to the HTTP request from the phishing site.

Note that if a plurality of phishing kits are downloaded at S2, the phishing site detection device 10 repeats processing of S3 to S6 for each of the downloaded phishing kits, although the description thereof is omitted here. In this manner, the phishing site access module 15 is able to collect block conditions of various phishing sites and access results regarding phishing sites using such block conditions.

Next, using FIG. 7, there will be described an example of processing procedures by the phishing site detection device 10 for detecting a phishing site on the basis of the access results collected in FIG. 6.

Figure 6:
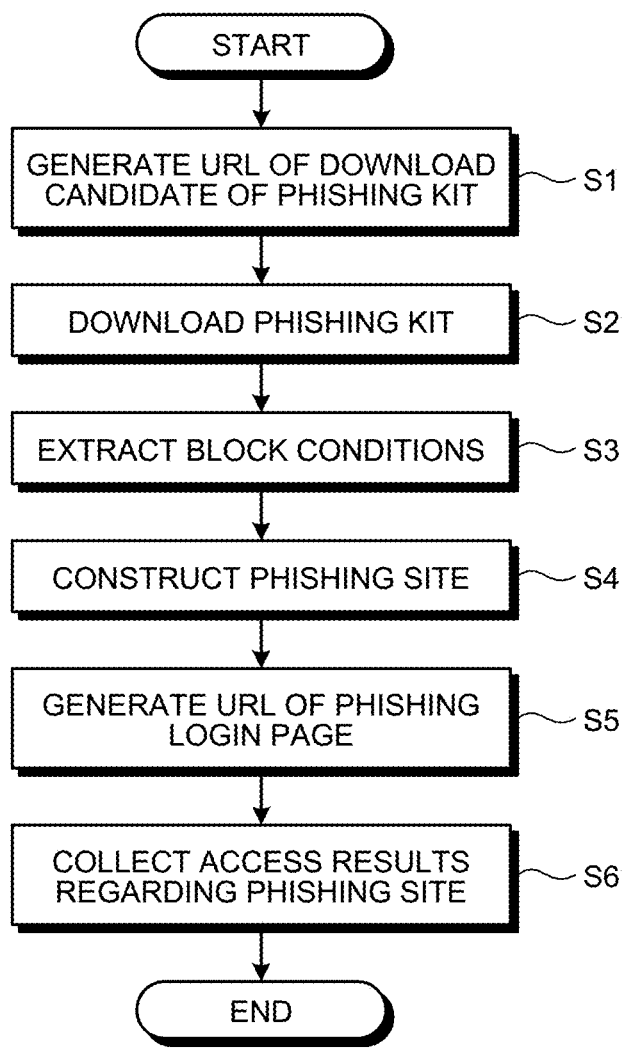
FIG. 6 is a flowchart illustrating an example of a processing procedure for collecting phishing site access results by the phishing site detection device of FIG. 1.
Figure 7:
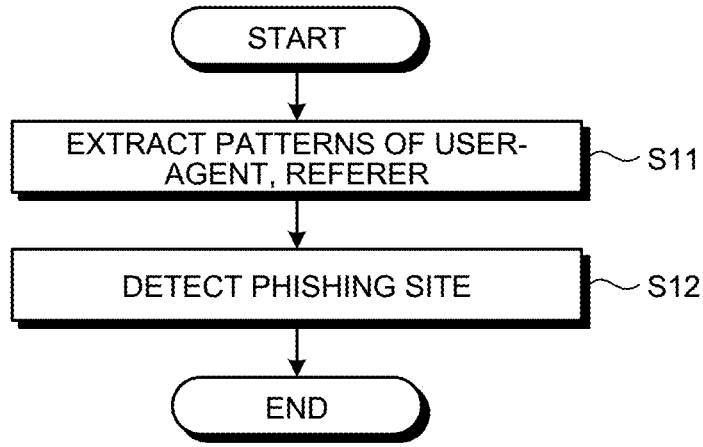
FIG. 7 is a flowchart illustrating an example of a processing procedure for detecting a phishing site by a phishing site detection device of FIG. 1.

First, the phishing site detection device 17 of the phishing site detection module 10 extracts, from the access results (access result information) collected in FIG. 6, patterns of User-Agent, Referer for detecting a phishing site (S11: extract patterns of User-Agent, Referer). Then, the phishing site detection module 17 accesses a website that may be a phishing site using the patterns of User-Agent, Referer extracted at S11, and determines whether the website is a phishing site on the basis of a response from the website (S12: detect phishing site).

In this manner, the phishing site detection device 10 is able to detect even a phishing site having an access block function as a phishing site.

[Generation of URL of Download Source of Phishing Kit]

The following will describe the generation of a URL of a download source of a phishing kit by the phishing kit download module 11.

The phishing kit download module 11 stepwisely deletes the description of the directory of the URL of a phishing site (phishing site URL) from the end, for example, to generate candidates of the URL of the download source (download candidate) of the phishing kit, as illustrated in FIG. 8.

For example, in a case where the phishing site URL is "http://phish.example.com/aaa/bbb/login/info/index.php", the phishing kit download module 11 sequentially deletes the description of the URL from the directory at the end of the URL, and generates download candidates (1-1) to (1-5) illustrated in FIG. 8.

Thereafter, the phishing kit download module 11 accesses the URLs of the generated download candidates (1-1) to (1-5) and intends to download the phishing kit. For example, the phishing kit download module 11 accesses the URLs of the download candidates (1-1) to (1-*i*) following the procedures illustrated in FIG. 9.

First, the phishing kit download module 11 accesses the URL of a download candidate (1-*i*) (S21 of FIG. 9). Then, when the phishing kit download module 11 has determined that the access destination is an open directory (that is, the title includes "Index of") and any of the links of the open directory has ".zip" (Yes at S22→Yes at S23), the phishing kit download module 11 downloads a compressed file from the link having ".zip" (S24). The downloaded compressed file is loaded to the phishing site action reproduction module 13 (S25). Meanwhile, when the phishing kit download module 11 has determined that the access destination is not an open directory (No at S22) or any of the links of the open directory does not have ".zip" (No at S23), the procedure advances to S26.

After S25, the phishing kit download module 11 determines whether an unaccessed URL of a download candidate exists (S26). If an unaccessed URL of a download candidate exists (Yes at S26), the phishing kit download module 11 increments i (S27), and the procedure returns to the processing at S21. Meanwhile, after S25, if an unaccessed URL of the download candidate does not exist (No at S26), the procedure is finished.

Moreover, in generating a URL of a download candidate, the phishing kit download module 11 may generate a URL formed by stepwisely deleting the description of the directory of a phishing site URL from the end, and then add an extension indicating a compressed file such as ".zip" at the end of each URL (see the download candidates (2-1) to (2-4) illustrated in FIG. 10). In this case, an extension indicating a compressed file is already added to URLs of the download candidates. Thus, the phishing kit download module 11 may sequentially access the URLs of the download candidates and download the applicable files, if exist, from the access destinations.

This facilitates the phishing kit download module 11 to download a phishing kit from a phishing site, even if a place where the phishing kit is stored in the phishing site is unknown.

[Extraction of block conditions]

The following will describe the extraction of block conditions by the block condition extraction module 14. The block condition extraction module 14 acquires a compressed file (a compressed file that may be a phishing kit) that is stored in the phishing kit storage module 12, for example, loads the compressed file, and extracts, from the .htaccess file in the loaded file, User-Agent and Referer that may be block conditions using a regular expression.

For example, the block condition extraction module 14 extracts, from the .htaccess file illustrated in FIG. 11, User-Agent and Referer (see the underlined parts of FIG. 11) that may block conditions using a regular expression. For example, the block condition extraction module 14 converts the description regarding Referer indicated by the reference sign 101 into a regular expression (Regex) indicated by the reference sign 102, and extracts it. Moreover, the block condition extraction module 14 converts the description regarding the Referer indicated by the reference sign 103 into a regular expression (Regex) indicated by the reference sign 104, and extracts it.

[Specifying of file of phishing login page] The following will describe the specifying of a file of a phishing login page by the phishing site access module 15. For example, the phishing site access module 15 specifies, among files included in a phishing kit, a file backward-matching the URL of a phishing site that is the download source of the phishing kit, as a file of a phishing login page.

Figure 12:
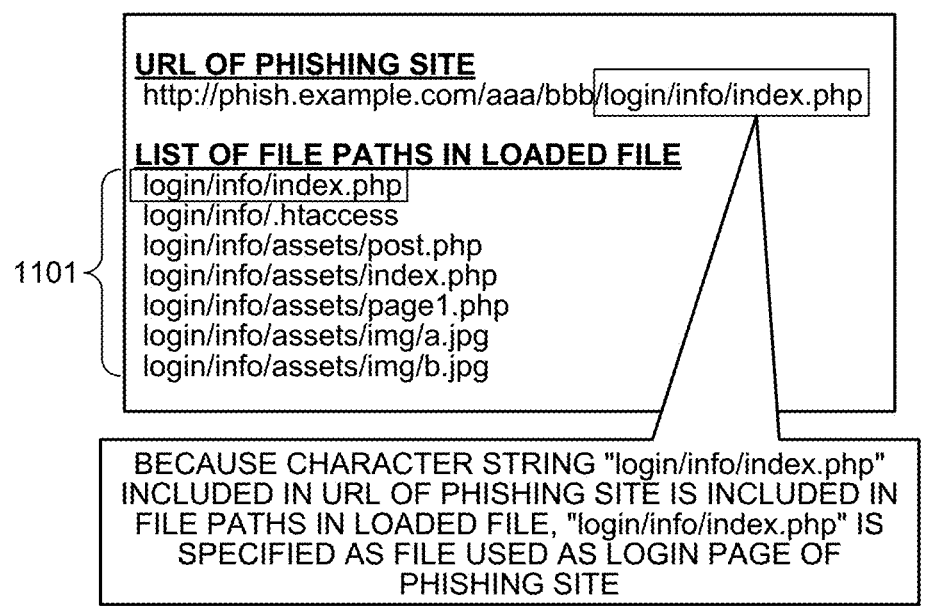
FIG. 12 is a diagram for explaining an example of specifying of a file of a phishing login page by a phishing site access module of FIG. 1.

For example, it is supposed that the URL of the phishing site that is the download source of the phishing kit is "http://phish.example.com/aaa/bbb/login/info/index.php", and the file path in the file after loading the phishing kit is a file path group indicated by the reference sign 1101, as illustrated in FIG. 12. In this case, the character string "login/info/index.php" included in the URL of the phishing site is included in the file path group in the loaded file. Thus, the phishing site access module 15 specifies "login/info/index.php" as a file used as a login page of a phishing site. Then, the phishing site access module 15 accesses the above-described specified file in the phishing site constructed by the phishing kit.

Note that some phishing kits include a PHP code shown in the following Mathematical 1 in a file accessed first, and have a function of copying, when a phishing site constructed by such phishing kits is accessed, a specific folder to a folder name of a random character string and guiding to the folder.

$dst=base64_encode (md5(rand(0,10000000)));
$src="assets";
recurse_copy($src,$dst); //any desired function for folder copying
header("Location:$dst/index.php")

Figure 13:
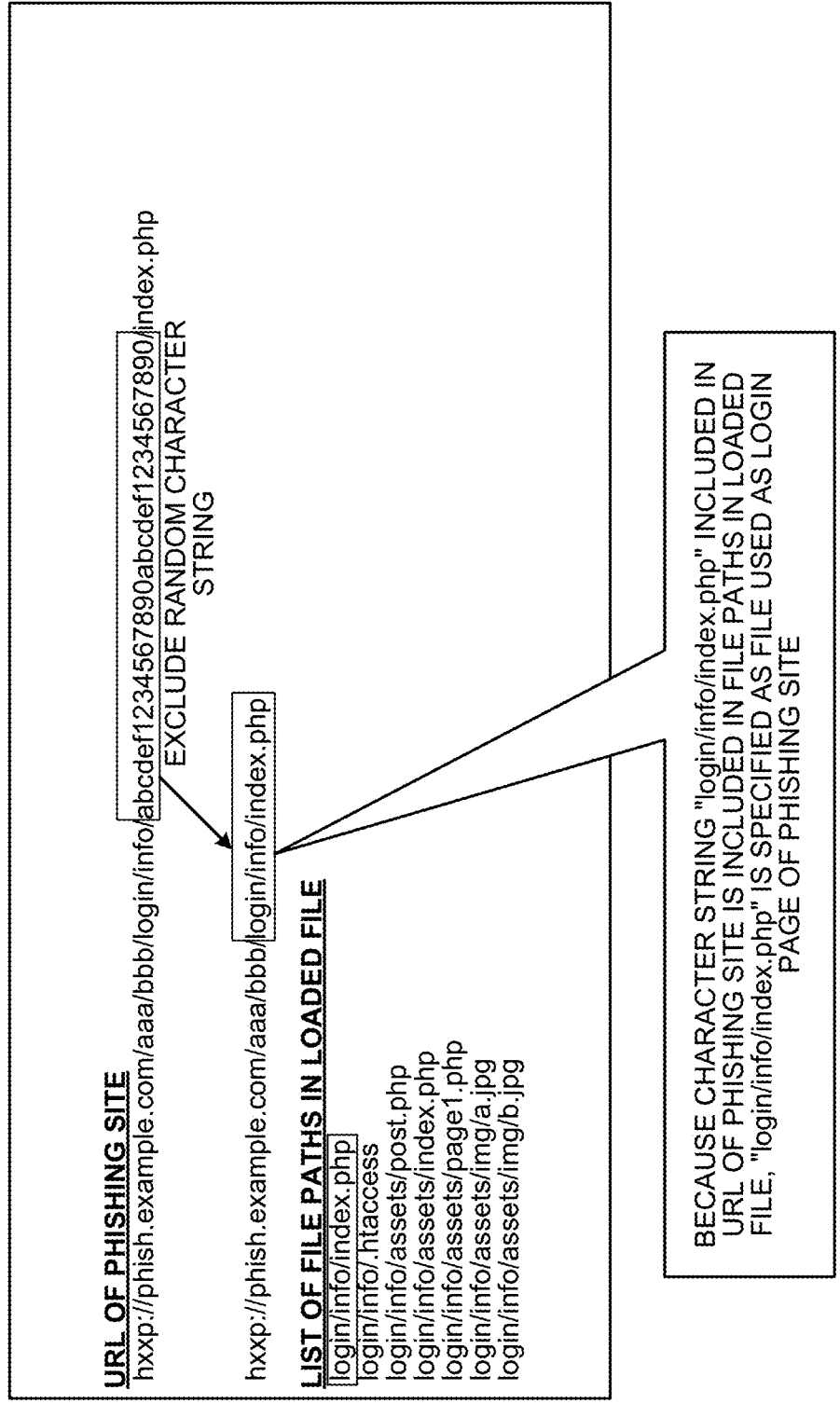
FIG. 13 is a diagram illustrating an example of specifying of a file of a phishing login page in a case where a URL of the phishing site includes description of a random character string.

In this case, the URL of the phishing site includes a random character string as illustrated in FIG. 13, for example. Thus, the phishing site access module 15 may not be able to specify a file backward-matching the URL of the phishing site among files included in the phishing kit.

Then, in a case where the above-described URL of the phishing site includes a random character string, the phishing site access module 15 uses a URL formed by excluding (deleting) the description of the random character string from the URL of the phishing site so as to specify a file backward-matching the URL of the phishing site among files included in the phishing kit. Note that in the above-described URL of the phishing site, the random character string to be excluded is expressed in a regular expression as follows.

$$([¥w]\{32,\}|[0-9A-Z]\{20\})(¥=)\{0,2\}$$

One example will be described. For example, if the path part of the URL of a phishing site includes a random character string, as illustrated in FIG. 13, the phishing site access module 15 excludes (deletes) the expression of the random character string. Then, the phishing site access module 15 specifies, among files in the loaded file of the phishing kit, a file backward matching the URL of the phishing site after excluding the random character string, as a file used as a login page of the phishing site.

This allows the phishing site access module 15 to specify a file used as a login page of a phishing site even if the URL of the phishing site includes a random character string. Consequently, the phishing site access module 15 is able to access a login page of the phishing site more easily.

In the above-described phishing site detection device 10, it is possible to detect even a phishing site having an access block function as a phishing site.

Note that in the case of a phishing site blocking access using PHP or the like, a variety of formats exist, which has made it difficult to extract block conditions and determine whether a website is a phishing site in the conventional technique. However, the phishing site detection device 10 collects access results of access with various conditions to phishing sites operating in a closed environment, and determines whether a website is a phishing site using the collected access result. As a result, the phishing site detection device 10 is able to detect even a phishing site blocking the access using PHP or the like as a phishing site.

[Computer Program]

Moreover, it is possible to provide a computer program achieving the functions of the phishing site detection device 10 of the above-described embodiment by installing it to a desirable information processing device (computer). For example, the information processing device is controlled to execute the above-described computer program provided as package software or online software, so that the information processing device functions as the phishing site detection device 10. The examples of the information processing device here include a desktop-type or a notebook-type personal computer, a rack-mounted server computer, and the like. In addition, the examples of the information processing device also include, in the range thereof, a mobile communication terminal such as a smartphone, a cellular phone, a personal handyphone system (PHS), a personal digital assistant (PDA), and the like. Moreover, the phishing site detection device 10 may be provided on a cloud server.

Figure 14:
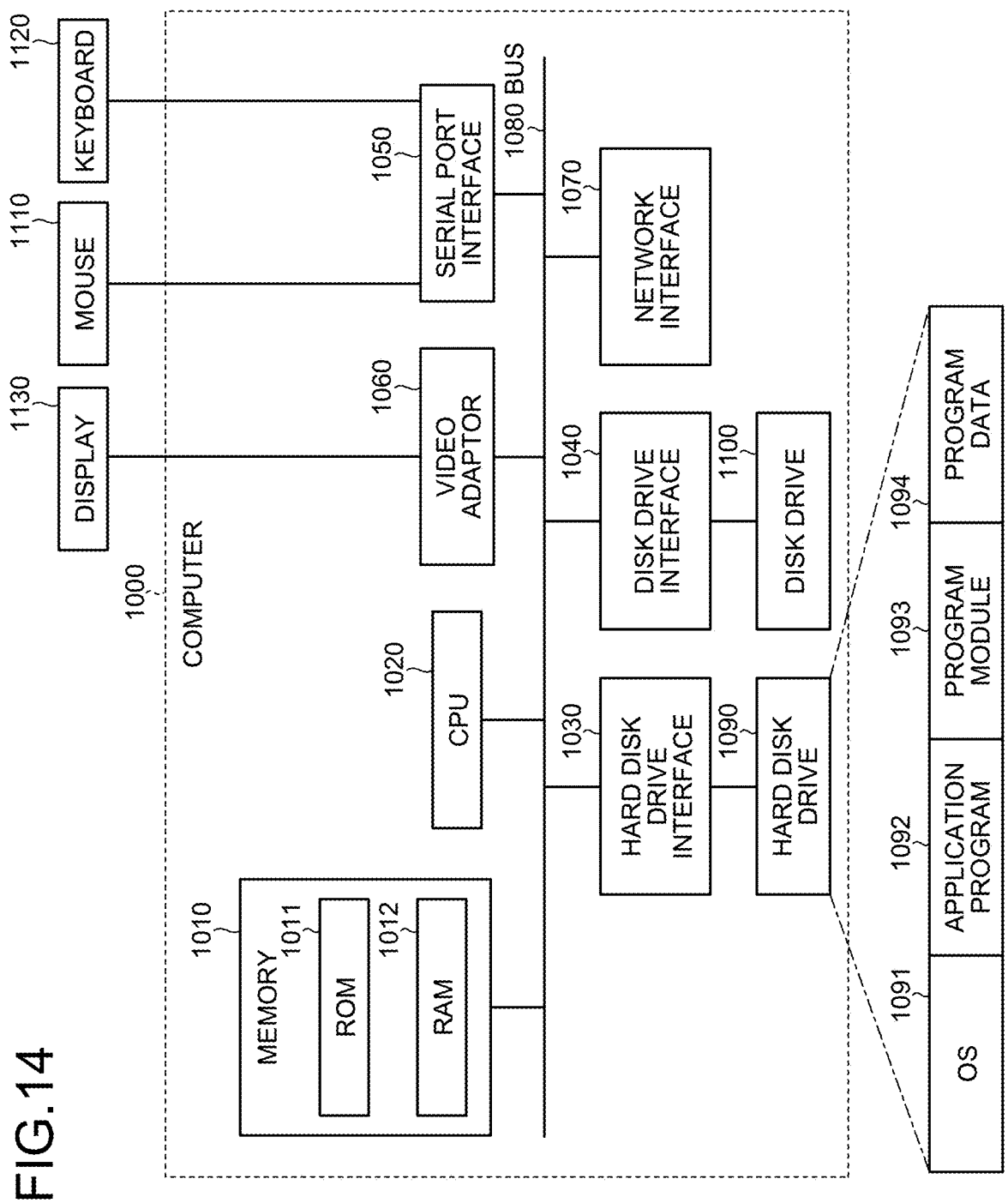
FIG. 14 is a diagram illustrating an example of a computer that executes a phishing site detection program.

The following will explain an example of a computer executing the above-described computer program (phishing site detection program) using FIG. 14. As illustrated in FIG. 14, a computer 1000 includes, for example, a memory 1010, a CPU 1020, a hard disk drive interface 1030, a disk drive interface 1040, a serial port interface 1050, a video adaptor 1060, and a network interface 1070. These parts are connected by a bus 1080.

The memory 1010 includes a read only memory (ROM) 1011 and a random access memory (RAM) 1012. The ROM 1011 stores a boot program such as a basic input output system (BIOS), for example. The hard disk drive interface 1030 is connected to a hard disk drive 1090. The disk drive interface 1040 is connected to a disk drive 1100. A removable recording medium such as a magnetic disk or an optical disk, for example, is inserted to the disk drive 1100. A mouse 1110 and a keyboard 1120, for example, are connected to the serial port interface 1050. A display 1130, for example, is connected to the video adaptor 1060.

Here, as illustrated in FIG. 14, the hard disk drive 1090 stores, for example, an OS 1091, an application program 1092, a program module 1093, and program data 1094, for example. The various kinds of data and information in the above-described embodiment are stored in the hard disk drive 1090 or the memory 1010.

Then, the CPU 1020 reads out, if necessary, the program module 1093 or the program data 1094 stored in the hard disk drive 1090 onto the RAM 1012, and performs the above-described procedures.

Note that the program module 1093 and the program data 1094 of the above-described phishing site detection program are not necessarily stored in the hard disk drive 1090, and may be stored in a removable storage medium and read out by the CPU 1020 through the disk drive 1100 or the like. Alternatively, the program module 1093 and the program data 1094 of the above-described computer program may be stored in another computer connected through a network such as LAN or WAN (wide area network), and read out by the CPU 1020 through the network interface 1070.

REFERENCE SIGNS LIST

10 phishing site detection device
11 phishing kit download module
12 phishing kit storage module
13 phishing site action reproduction module
14 block condition extraction module
15 phishing site access module
16 access result storage module
17 phishing site detection module

The invention claimed is:

1. A phishing site detection device, comprising:
a memory; and
a processor coupled to the memory and programmed to execute a process comprising:
acquiring a phishing kit that is a tool for constructing a phishing site;

constructing a phishing site using the acquired phishing kit and reproducing actions of a phishing site;

extracting, from the phishing kit, a condition of access sources with which an access to the phishing site constructed using the phishing kit is blocked;

accessing each phishing site constructed by each phishing kit using the extracted condition of access sources, and forming access result information that associates an access result regarding the phishing site and the condition of access sources used for the access to the phishing site; and selecting a condition of access sources with which the access to the phishing site is blocked on a basis of the access result indicated in the access result information, perform processing of accessing a website that has a possibility of being a phishing site at least once, and determine, if the access to the website is blocked, that the website is a phishing site.

2. The phishing site detection device according to claim 1, wherein the condition of access sources is at least one of User-Agent and Referer of an access source.

3. The phishing site detection device according to claim 1, wherein the acquiring the phishing kit from a phishing site.

4. The phishing site detection device according to claim 1, wherein the acquiring specifying, among files included in the phishing kit, a file backward-matching a URL of the phishing site, as a file of a login page of the phishing site, and accessing the file of the login page in the reproduced phishing site.

5. The phishing site detection device according to claim 4, wherein deleting, if a URL of the phishing site includes a random character string, the random character string from the URL of the phishing site, and specifying, among files included in the phishing kit, a file backward-matching a URL of the phishing site after deleting the random character string, as a file of a login page of the phishing site.

6. A phishing site detection method performed by a phishing site detection device, comprising:

a step of acquiring a phishing kit that is a tool for constructing a phishing site;

a step of constructing a phishing site using the acquired phishing kit and reproducing actions of a phishing site;

a step of extracting, from the phishing kit, a condition of access sources with which an access to the phishing site constructed using the phishing kit is blocked;

a step of accessing each phishing site constructed by each phishing kit using the extracted condition of access sources, and forming access result information that associates an access result regarding the phishing site and the condition of access sources used for the access to the phishing site; and a step of selecting a condition of access sources with which the access to the phishing site is blocked on a basis of the access result indicated in the access result information, performing processing of accessing a website that has a possibility of being a phishing site at least once, and determining, if the access to the website is blocked, that the website is a phishing site.

7. A non-transitory computer-readable recording medium having stored therein phishing site detection program causing a computer to execute a process comprising:

acquiring a phishing kit that is a tool for constructing a phishing site;

constructing a phishing site using the acquired phishing kit and reproducing actions of a phishing site;

extracting, from the phishing kit, a condition of access sources with which an access to the phishing site constructed using the phishing kit is blocked;

accessing each phishing site constructed by each phishing kit using the extracted condition of access sources, and forming access result information that associates an access result regarding the phishing site and the condition of access sources used for the access to the phishing site; and selecting a condition of access sources with which the access to the phishing site is blocked on a basis of the access result indicated in the access result information, performing processing of accessing a website that has a possibility of being a phishing site at least once, and determining, if the access to the website is blocked, that the website is a phishing site.

* * * * *